(12) United States Patent
Lomerson, Jr.

(10) Patent No.: US 9,156,570 B2
(45) Date of Patent: Oct. 13, 2015

(54) METHOD OF FORMING U-SHAPED INSERT AND INSERTING ABOUT GOODS IN CONTAINER

(71) Applicant: Roland Lomerson, Jr., Lakewood Ranch, FL (US)

(72) Inventor: Roland Lomerson, Jr., Lakewood Ranch, FL (US)

(73) Assignee: AMF Automation Technologies, LLC, Richmond, VA (US)

(*) Notice: Subject to any disclaimer, the term of this patent is extended or adjusted under 35 U.S.C. 154(b) by 319 days.

(21) Appl. No.: 13/868,322

(22) Filed: Apr. 23, 2013

(65) Prior Publication Data
US 2013/0232918 A1 Sep. 12, 2013

Related U.S. Application Data

(62) Division of application No. 12/786,779, filed on May 25, 2010, now abandoned.

(51) Int. Cl.
B65B 5/06 (2006.01)
B65B 5/10 (2006.01)
B65B 25/16 (2006.01)
B65B 41/06 (2006.01)
B65B 43/24 (2006.01)
B65B 61/20 (2006.01)
B65B 5/02 (2006.01)
B25J 15/00 (2006.01)
B25J 15/02 (2006.01)
B25J 15/06 (2006.01)
B66C 1/02 (2006.01)
B66C 1/58 (2006.01)

(52) U.S. Cl.
CPC ............... B65B 5/02 (2013.01); B25J 15/0052 (2013.01); B25J 15/024 (2013.01); B25J 15/0616 (2013.01); B65B 5/06 (2013.01); B65B 5/105 (2013.01); B65B 25/16 (2013.01); B65B 41/06 (2013.01); B65B 43/24 (2013.01); B65B 61/207 (2013.01); B66C 1/0243 (2013.01); B66C 1/58 (2013.01)

(58) Field of Classification Search
CPC .... B65B 61/207; B65B 43/305; B65B 43/24; B65B 41/06; B65B 41/04; B65B 35/38; B65B 35/36; B65B 25/16; B65B 5/105; B65B 5/06
USPC ........ 53/139.5, 154–157, 238, 244, 247, 263, 53/472, 474, 475
See application file for complete search history.

(56) References Cited

U.S. PATENT DOCUMENTS 3,368,324 A * 2/1968 Leedy ............................. 53/247
3,604,184 A * 9/1971 Shuttleworth ................... 53/157
(Continued)

FOREIGN PATENT DOCUMENTS

DE 19712787 A1 * 10/1998 ............ B65B 61/207
EP 2163478 A1 * 3/2010 .............. B65B 35/38
(Continued)

Primary Examiner — Stephen F Gerrity
(74) Attorney, Agent, or Firm — Thomas/Horstemeyer, LLP

(57) ABSTRACT

End of arm tool (10) is used to load goods A and B in two layers in a packing container (8), with a packing insert positioned between the layers. The tool (10) also grasps a packing insert in the form of a flat sheet, bends the ends of the packing sheet downwardly to form an inverted U shape, and then inserts the packing insert in a straddling relationship about the lower layer of goods A, to protect the lower layer of goods from the weight applied by the upper layer of goods B.

7 Claims, 4 Drawing Sheets

(56) References Cited

U.S. PATENT DOCUMENTS

| | | | |
|---|---|---|---|
| 3,710,532 A * | 1/1973 | Smilek et al. | 414/789.5 |
| 4,233,802 A * | 11/1980 | Booth et al. | 53/475 |
| 4,787,812 A | 11/1988 | Gopfert | |
| 4,850,627 A | 7/1989 | Franklin | |
| 5,024,575 A | 6/1991 | Anderson | |
| 5,088,878 A | 2/1992 | Focke et al. | |
| 5,813,713 A | 9/1998 | Van Den Bergh | |
| 6,669,616 B1 | 12/2003 | Bierenacki et al. | |
| 7,017,961 B1 | 3/2006 | Parnell et al. | |
| 7,243,481 B2 | 7/2007 | Draghetti | |
| 7,422,551 B2 | 9/2008 | Monti | |
| 7,481,472 B2 | 1/2009 | Cawley et al. | |
| 7,568,325 B2 | 8/2009 | Monti | |
| 8,172,292 B1 * | 5/2012 | Andersen | 294/207 |
| 2008/0000203 A1 * | 1/2008 | Gilmore et al. | 53/475 |
| 2009/0320417 A1 * | 12/2009 | Gilmore | 53/473 |
| 2010/0040450 A1 | 2/2010 | Parnell | |

FOREIGN PATENT DOCUMENTS

| | | | | |
|---|---|---|---|---|
| GB | 914957 A * | 1/1963 | | B65B 5/105 |
| JP | 06191507 A * | 7/1994 | | 53/156 |

* cited by examiner

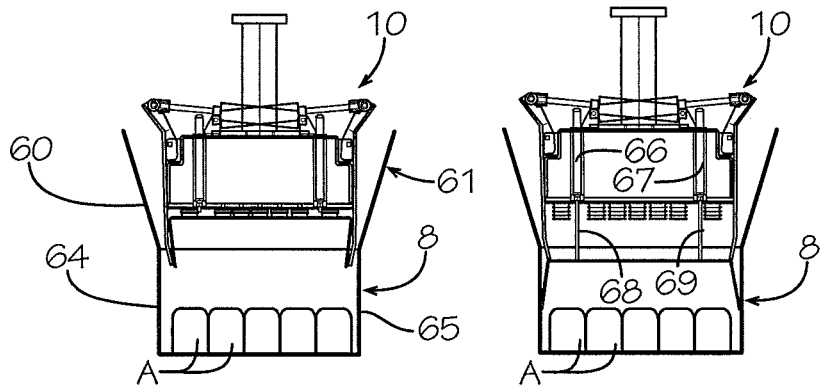
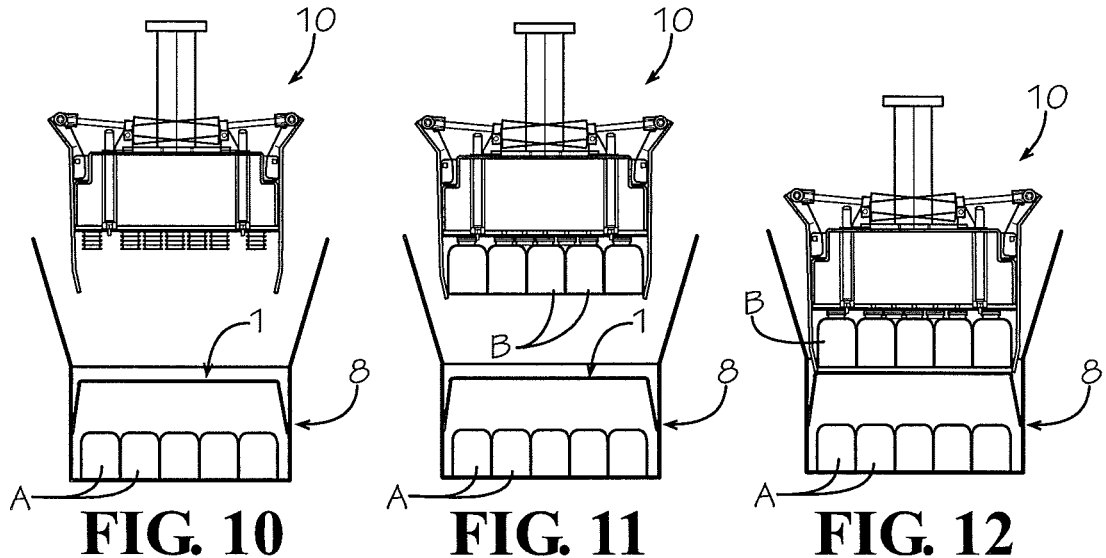
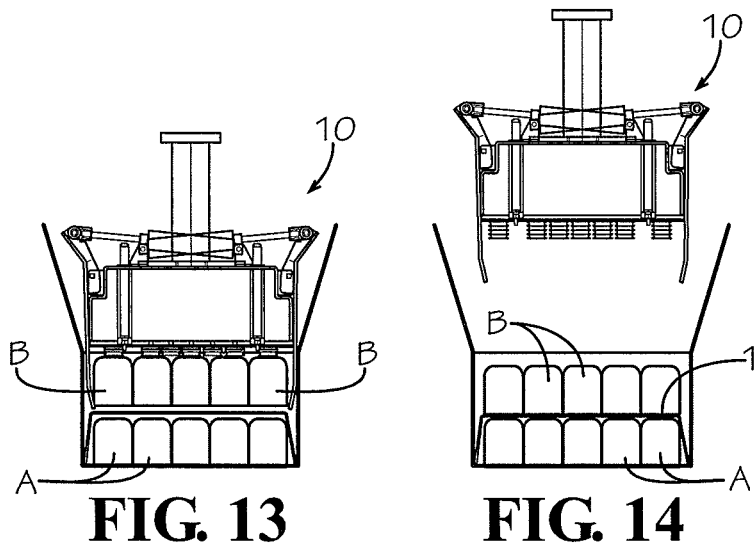

METHOD OF FORMING U-SHAPED INSERT AND INSERTING ABOUT GOODS IN CONTAINER

CROSS REFERENCE TO RELATED APPLICATION

This is a division of U.S. patent application Ser. No. 12/786,779, filed May 25, 2010 in the U.S. Patent & Trademark Office, published Dec. 1, 2011, Publication Number 2011/0293397.

TECHNICAL FIELD

The present disclosure concerns a robotic packaging apparatus and method, including an end effector for picking a work product, bending the oppositely extending lateral sides of the work product to form a U-shape, and placing the U-shaped product in a container.

BACKGROUND OF THE DISCLOSURE

In the packing of goods in multiple levels in a box or other shipping container, it may be desirable to have a packing insert placed in the shipping container that extends between levels of the goods in the container to avoid the weight of the goods in an upper level from bearing against the goods below. This also tends to strengthen the container when several of the containers are stacked one upon another. For example, packing inserts may be used in containers for protecting food products, products that comprise fragile goods or soft goods like bread, or other products that might become damaged by the weight of an upper layer of goods bearing down on a lower layer of goods.

One form of a packing insert might be an inverted U-shaped cardboard sheet having an intermediate portion that is to be placed over the goods and facing the opening of the shipping container and opposed lateral sides bent downwardly to form the inverted U-shape. The lower layer of goods will be placed in the shipping container before the packing insert is placed in the container. The downwardly extending lateral sides of the packing insert will be telescopically tucked into the container adjacent the opposite side walls of the container, between the side walls and the goods in the container, until the lateral sides of the packing insert extend down into engagement with the bottom of the container and the intermediate portion of the packing insert extends across the top of the goods in the shipping container. The lateral sides of the packing insert provide support for the intermediate portion of the packing insert that extends over the lower layer of the goods. The intermediate portion of the packing insert functions to support the upper layer of goods.

The U-shaped packing insert may also rigidify the shipping container so that several shipping containers may be stacked upon one another without damage to the containers and the goods in the containers. This also helps to protect the container from penetration by sharp objects, thereby assuring safer delivery to the customer.

Generally, the panel that forms the U-shaped packing insert, which in this instance is considered to be the "work product", may include score lines that assist in folding the panel into the correct proportions that correspond to the proportions of the container and the goods in the container. While the use of score lines on the panels assist in forming the panel into a U-shape, it is still burdensome for the panels to be properly bent and inserted into the containers by hand in a large volume continuous packing operation.

SUMMARY OF THE DESCRIPTION

Accordingly, this disclosure concerns an end of arm tool for a robot that includes a dual function of placement of goods in a shipping container, followed by picking, forming and placing the protective packing insert that extends about and over the goods in the shipping container.

The packing insert may be a generally flat work product, such as that described above, comprising a cardboard sheet that includes an intermediate portion of the work product, and the oppositely extending lateral sides of the work product that are bent to form the inverted U-shape with respect to the intermediate portion of the work product. The end of arm tool picks the work product from a supply, forms the work product into a U-shape and then places the U-shaped work product in the shipping container over the goods packed in the container. The opposite parallel ends of the work product are tucked internally of the shipping container adjacent the opposite side walls of the shipping container so that the work product extends about the goods in the shipping container.

The method and apparatus disclosed herein provide for continual repetitive operation of an end of arm tool. This may comprise a first step of picking and placing a pattern of goods in the shipping container that form a lower layer of goods. A second step may comprise a sequence of picking the work product, folding the work product into an inverted U-shape, introducing the work product into the shipping container with the lateral sides of the work product aligned with the outer boundaries of the first layer of goods in the shipping container, and withdrawing the tool from the work product and shipping container while maintaining the work product in its position during the withdrawal movements.

The process may further include a third step of picking and placing a second pattern of goods in the shipping container on the intermediate portion of the work product, to form an upper layer of goods in the shipping container. The weight of the upper level of goods tends to urge the work product downwardly in the shipping container until the lateral sides of the work product engage and become supported by the bottom wall of the container.

All of these steps are to be done in rapid and accurate movements, automatically and efficiently in a minimum amount of time.

The tool that is placed at the end of an arm of a robot may include a vacuum plenum housing with at least one vacuum retriever extending down from the vacuum plenum housing for engaging and picking the work products. The vacuum retriever may be suction cups or suction bellows that contact and adhere to the goods that are to be packed in the shipping container. The same vacuum retrievers may be used for engaging and picking the intermediate portion of the work product so that it may lift the work product away from a supply of the work products, and move the work product from the supply toward the shipping containers.

The tool may include a pair of forming arms that are used to engage and fold the oppositely extending lateral sides of the work product into an inverted U-shape with respect to the intermediate portion of the work product. The forming arms may also be used in the procedure of picking and packing the goods into the container by urging the goods in a compact configuration that best fits in the shipping container.

The forming arms may include proximal ends that are pivotally supported adjacent the vacuum plenum housing and distal ends that are pivoted from the level above the vacuum retrievers to a downwardly, substantially parallel arrangement during which time the forming arms engage the oppositely extending lateral sides of the work product and bend them into a U-shape with respect to the intermediate portion of the work product.

The forming arms may include an obtuse angle adjacent their distal ends for the purpose of tucking the distal ends of the lateral sides of the work product into the shipping container.

The tool may also include a discharge means that is moveable between the packing positions out of the way of the vacuum retriever and then to distended positions in which they engage the intermediate portion of the work product after the folded lateral sides of the work product have been at least partially tucked into the sides of the shipping container. This pushes the work product on into the container as the vacuum is released from the vacuum retriever. This allows separation between the vacuum retriever and the intermediate portion of the work product, leaving the work product behind and positioned inside the shipping container as the tool withdraws from the shipping container to begin a repeat cycle of its operations.

BRIEF DESCRIPTION OF THE DRAWINGS

FIGS. 4-10 illustrate the sequence of picking and forming the work product, inserting the product divider over the pattern of goods in the shipping container, and then withdrawing from the shipping container.

FIGS. 11-14 illustrate the sequence of placing another layer of goods in the container that are separated by the product divider from the original layer of products.

DETAILED DESCRIPTION

Figure 1:
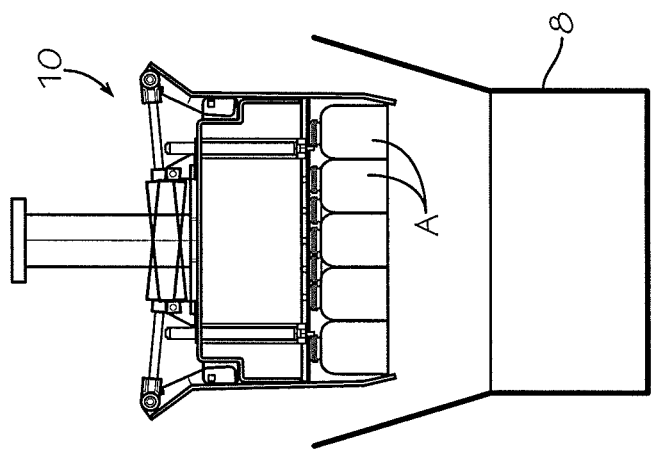
FIGS. 1-3 illustrate the sequence of placing a pattern of goods in a shipping container.
Figure 2:
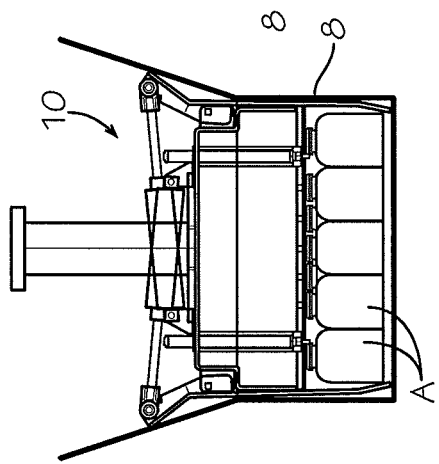
Figure 3:
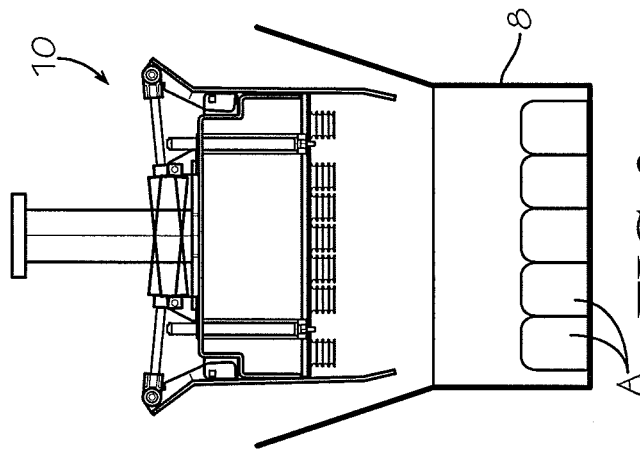

Referring now in more detail to the drawings, in which like numerals indicate like parts throughout the several views, FIGS. 1-3 illustrate the sequence of placing goods A in a shipping container 8, in which the end of arm tool 10 has picked the goods, such as loaves of bread that are soft and are likely to be damaged by applying the weight of other loaves stacked on them and has moved the goods over the shipping container 8 (FIG. 1). The tool 10 is lowered (FIG. 2) to place the goods A on the bottom of the container, and then raised to leave the goods in the shipping container (FIG. 3). This is conventional in the art.

FIGS. 4-10 illustrate the sequence of picking and forming the work product, inserting the work product in the shipping container, and then withdrawing from the shipping container.

Figure 4:
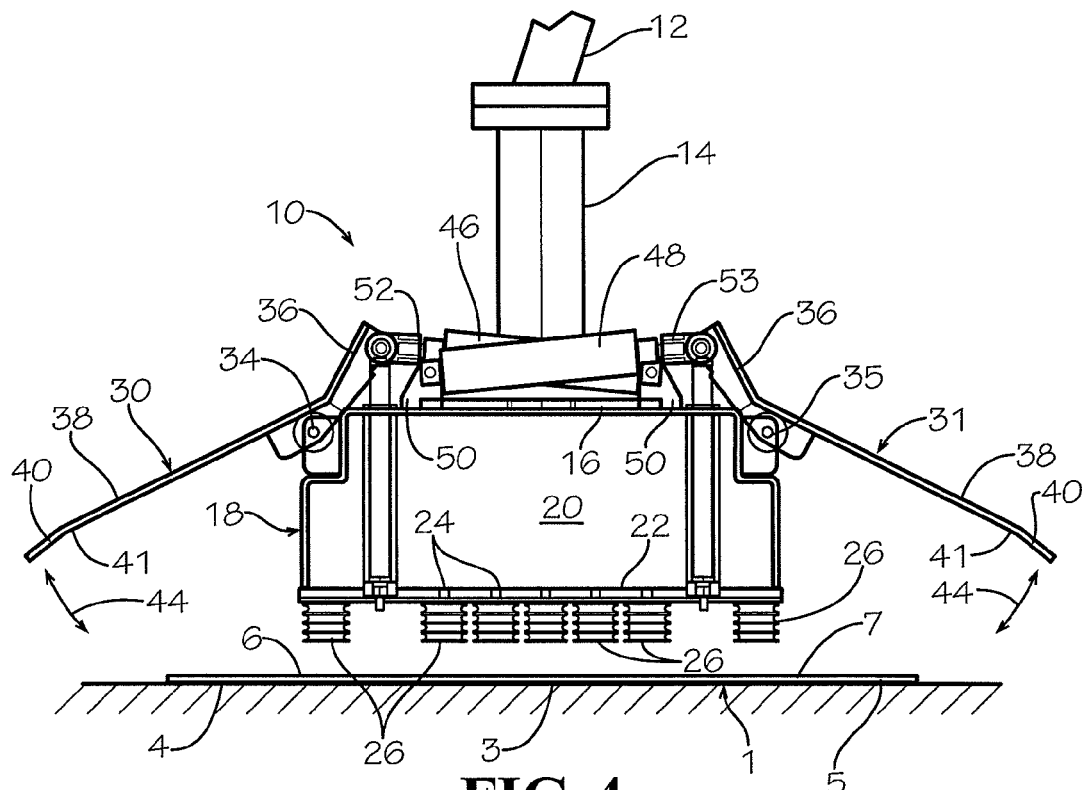
Figure 5:
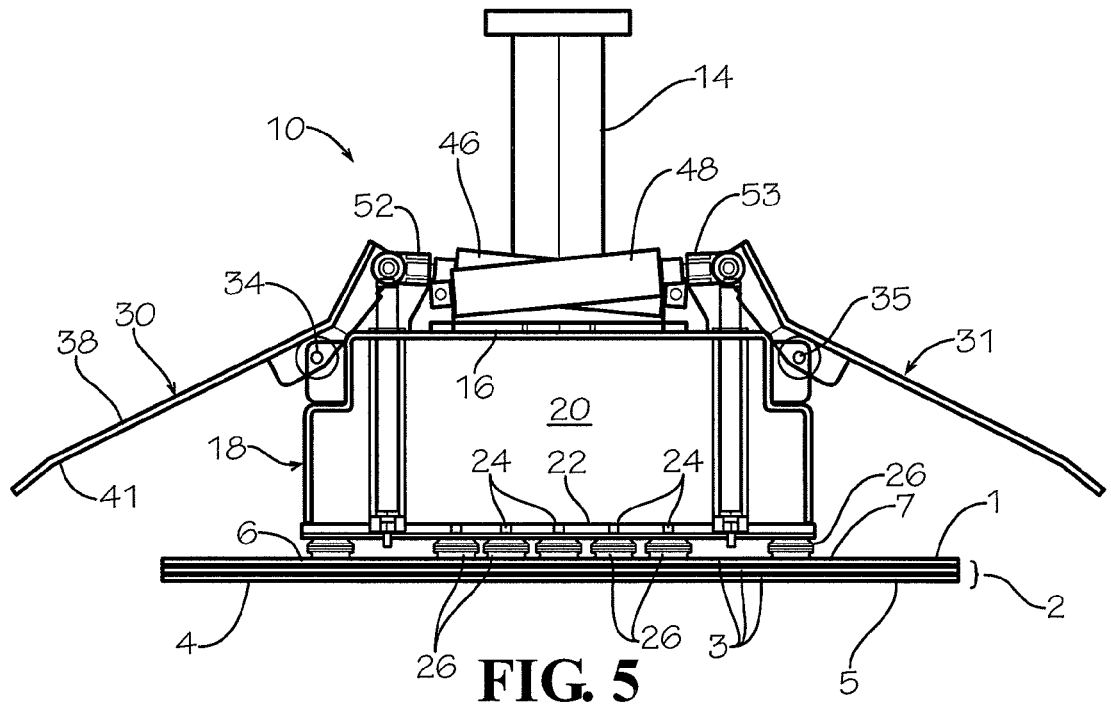
Figure 6:
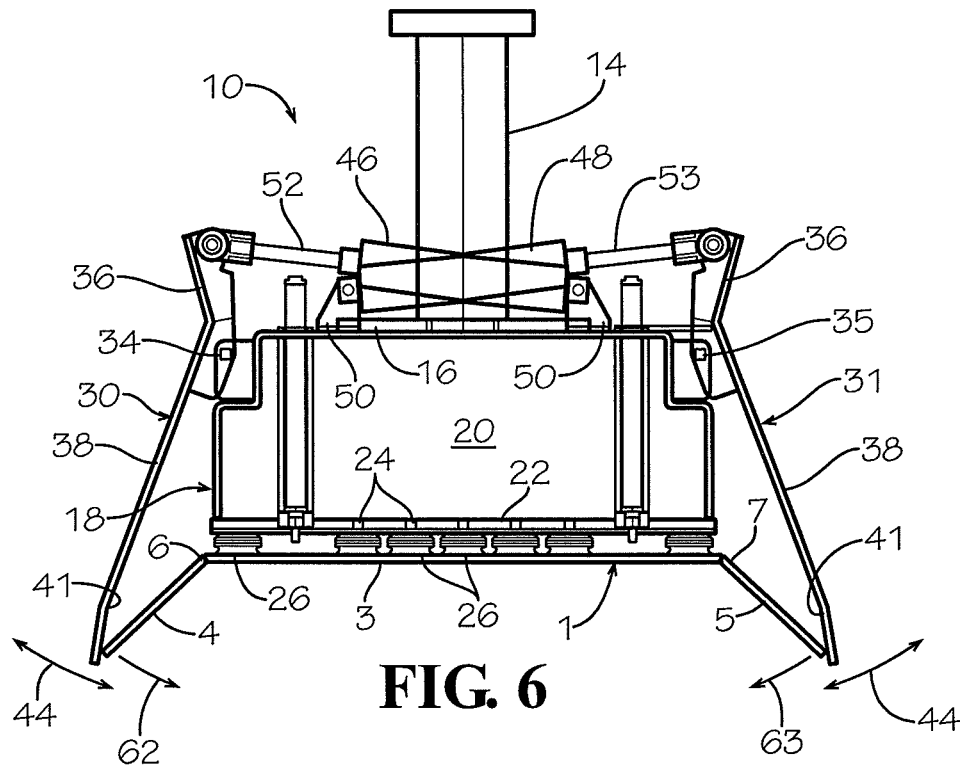
Figure 7:
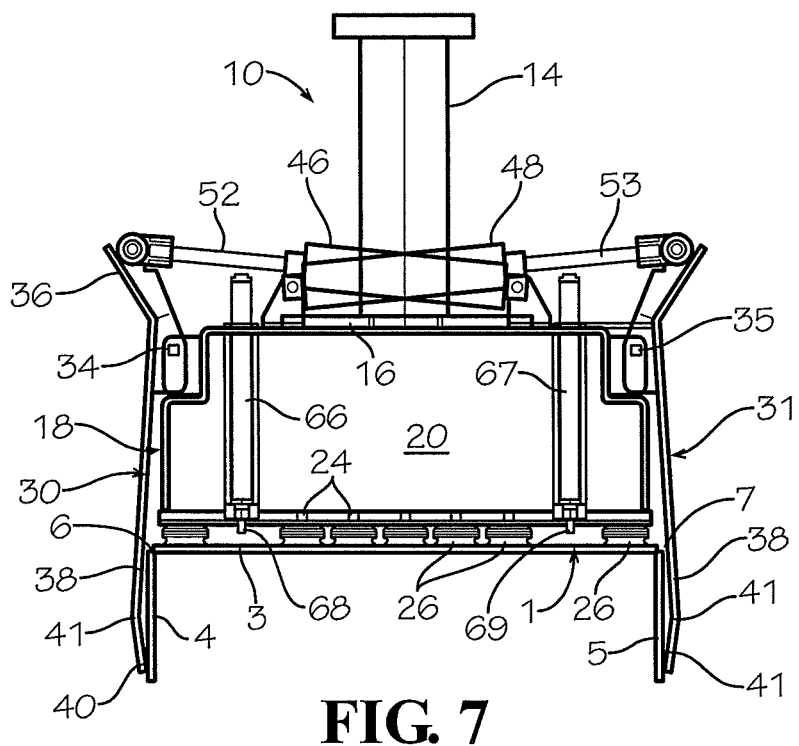

FIG. 4 illustrates the side view of an end of arm tool 10 that is connected to the arm of a robot 12. The robot arm 12 is shown in FIG. 4 as holding the end of arm tool 10 in engagement with the work product 1 that may be a single layer of the work product or the top work product on a vertical stack 2 of such products. The tool 10 is to pick a work product 1 and form the work product into an inverted U-shape (FIGS. 6 and 7). The work product is then inserted into a shipping container 8 (FIGS. 8 and 9) containing the goods A. The work product may have score lines 6 and 7 (FIGS. 4-6) that divide the work product into the intermediate portion 3 and side portions 4 and 5. The work product may be folded at its score lines as shown in FIGS. 6 and 7 so that its side portions 4 and 5 may be tucked into the shipping container between the vertical side walls of the shipping container 8. At this stage of the process, the work product does not have to be fully inserted about the goods A but should be aligned with the space below that is between the goods A and side walls of the shipping container.

The tool 10 includes a mast 14 connected to the robot arm 12 and a tool support 16 connected to the mast 14. Housing 18 is supported by tool support 16 and defines a vacuum plenum housing 20, and a source of vacuum such as the inlet of as a compressor (not shown) is connected to housing 18 to draw reduced air pressure within the vacuum plenum housing in a conventional manner. The tool support 16 may be formed as part of the housing 18, if desired.

Housing 18 includes a bottom wall 22 and a plurality of openings 24 are formed in the bottom wall. Vacuum retrievers 26 extend downwardly from the downwardly facing surface of the bottom wall 22 in communication with the openings 24. In this manner, the reduced air pressure of vacuum plenum housing 20 is applied to each vacuum retriever 26. Valves (not shown) are used to regulate the vacuum applied to each vacuum retriever 26. Vacuum retrievers and valves suitable for this use are disclosed in more detail in U.S. Pat. No. 7,000,964 and in my patent application Ser. No. 12/763,242, the disclosures of which are fully incorporated herein by reference.

Forming arms 30 and 31 are pivotally mounted to opposite sides of the upper portion of the housing 18, above the vacuum retrievers 26, by hinge pins 34 and 35, respectively. The forming arms may be identical in construction and each includes a proximal end portion 36 on the upper side of its hinge pin and a distal end portion 38 on the other side of its hinge pin. The distal end or tip 40 of each forming arm 30, 31 extends at an obtuse angle 41, forming a slight bend in the length of the distal end portion 38 of the forming arms 30, 31.

With this arrangement, the forming arms are moveable in arcs indicated by the double-headed arrows 44 of FIGS. 4 and 6 for folding the side portions 4 and 5 with respect to the intermediate portion 3 of the work product 1 at the score lines 6 and 7.

Fluid actuated cylinders 46 and 48 are supported over the vacuum plenum housing 20, with a support bracket 50 extending from the tool support 16 on opposite sides of the housing 18. Pistons 52 and 53 extend from the cylinders and are connected to the distal end portions 36 of the forming arms 30 and 31. When the pistons 52, 53 are distended, the forming arms 30 and 31 are tilted in a downward direction as indicated by the arrows 44 of FIGS. 4 and 6, to substantially parallel positions as shown in FIGS. 4 and 5. Likewise, when the pistons are retracted into their respective fluid actuated cylinders 46 and 48, the vacuum retrievers 26 move back from the position shown in FIG. 7 to the position shown in FIG. 4.

While FIG. 4 shows the end of arm tool 10 suspended over the work product 1, FIG. 5 shows the tool in engagement with the generally flat work product 1, with the vacuum retrievers 26 in full engagement with the work product 1 and with the low air pressure in the vacuum plenum housing 20 in direct communication with the work product 1. This connects the vacuum retrievers to the intermediate portion of the work product so that the work product will be picked by the tool 10. The work product 1 may be a single work product or the top work product in a vertical stack 2 of the products. The vacuum is applied by the tool only to the top work product so that when the tool is lifted from the stack of work products, only the top work product will be lifted, as shown in FIG. 6.

FIG. 6 shows the end of arm tool 10 after it has engaged the work product 1, has lifted the work product away from the stack of work products, and is beginning the movement toward a shipping container 8 shown in FIG. 8.

Shipping container 8 typically is a rectangular box formed of corrugated cardboard having lid flaps 60 and 61 as shown on FIG. 8 extending upwardly from side walls 64 and 65. The lid flaps are open so as to expose the upper opening of the shipping container. The shipping container will have been previously filled with the products A that are to be stored and/or shipped, typically with the products substantially filling the bottom half of the container 8.

As shown in FIG. 6, as the end of arm tool 10 moves from the stack of work products 1 toward the shipping container 8, fluid actuated cylinders such as pneumatic cylinders 46 and 48 begin to tilt the forming arms 30 and 31 as shown by arrows 44 of FIG. 6. When the forming arms are tilted to the extent shown in FIG. 6, they become engaged with the lateral sides 4 and 5 of the work product 1, bending the lateral sides 4 and 5 in the directions as indicated by arrows 62 and 63, from a horizontal attitude toward a vertical attitude shown in FIG. 7. The work products may have score lines such as score lines 6 and 7 to create accurate folding of the lateral side portions of the work products. When the forming arms 30 and 31 reach their downwardly extending substantially parallel attitudes, they will have moved from a level above the vacuum retrievers 26 to a level below the vacuum retrievers 26, reaching the lateral side portions 4 and 5 of the work product 1 and folding the side portions 4 and 5 inwardly to their vertical positions as shown in FIG. 7.

As shown in FIG. 7, the tip ends 40 of the forming arms 30 and 31 are formed at an obtuse angle 41 so that when the forming arms reach their approximately vertical positions, the tip ends 40 are angled toward each other. This allows the forming arms 30 and 31 to have the ability to push against the oppositely extending lateral sides 4 and 5 of the work product when the upper portions of the forming arms straddle the intermediate portion 3 of the work product 1 at the obtuse angle 41.

FIG. 7 shows the end of arm tool 10 after it has formed the work product in its desired position, ready for insertion in the shipping container. The tool and its work product will be in this configuration when the end of arm tool is positioned over the shipping container, ready to insert the work product into the shipping container.

The end of arm tool 10 and its work product 1 will be positioned directly over the shipping container 8, and the tool will be lowered as shown in FIG. 8 so that the lateral sides 4 and 5 of the work product will be accurately aligned just inside the container side walls 64 and 65, respectively. The forming arms 30 and 31 will guide the lateral side portions 4 and 5 into a tucked relationship just inside the side walls 64 and 65 of the shipping container, aligned between the goods A and the adjacent side walls 64 and 65 of the shipping container 8, as shown in FIGS. 8 and 9. The intermediate portion 3 of the work product is oriented horizontally and will come to rest at the entrance opening of the product container 8.

As shown in FIG. 9, once the work product 1 has been aligned with the shipping container 8, the vacuum retrievers will release their vacuum that is applied to the work product and the vacuum retrievers are no longer attached to the work product and the end of arm tool 10 is ready to begin to move upwardly to withdraw from the product container 8.

The end of arm tool 10 may leave the work product at a level in the shipping container with the lateral sides fully inserted about the sides of the goods A or only partially inserted as shown in FIGS. 9-11 where they are aligned with the space between the goods A and the sidewalls of the shipping container 8.

As shown in FIGS. 7 and 9, evacuation cylinders 66 and 67 include piston rods 68 and 69 that distend downwardly for urging against the upwardly facing horizontal surface of the intermediate portion 3 of the work product 1. The evacuation cylinders and/or their piston rods may extend through the housing 18 so that the piston rods are positioned in the array of vacuum retrievers 26 in the vicinity of the intermediate portion 3 of the work product 1.

In order to make sure that the work product 1 is inserted into the container 8 to the proper depth, the piston rods 68 and 69 of evacuation cylinders 66 and 67 (FIG. 9) are distended and engage the upwardly facing horizontal surface of the intermediate portion 3 of the work product 1, tending to push the work product further into the product container 8 as the forming arms 30 and 31 begin to withdraw from adjacent the side walls 64 and 65 of the product container 8. This assures that the action of withdrawing the forming arms 30 and 31 does not inadvertently lift the work product 1 out of the product container 8 during withdrawal. Also, this function applies a downward force to the work product and assures that the work product is properly inserted into the product container.

After the work product has been properly placed within the product container 8 over goods A as shown in FIGS. 9 and 10, the end of arm tool 10 will move away from the product container, back to retrieve another group of goods B. In the meantime, the piston rods 68 and 69 may be retracted back up into their respective evacuation cylinders 66 and 67, and the forming arms 30 and 31 may be pivoted upwardly from their positions shown in FIGS. 4 and 5 back to their original positions such as shown in FIGS. 1 and 2.

While only two evacuation cylinders 66 and 67 and their respective piston rods 68 and 69 are illustrated, other evacuation means, such as four cylinders and their respective piston rods may be used in a rectangular array for urging the work product into the shipping container 8. Thus, the evacuation cylinders and their respective piston rods function as discharge means that may be supported by the tool support for urging the U-shaped work product away from the vacuum retrievers and for urging the side portions of the work product into the container.

By using the same procedures, another level of goods B may be placed on the top of the work product that extends over the first level of goods A, as shown in FIGS. 11-14. The weight of the oncoming second level of goods will push the work product down toward the upper surfaces of the goods A, but the lateral sides of the work product are dimensioned to engage the bottom of the shipping container as the intermediate portion of the work product approaches the lower level of the goods A, as shown in FIG. 14. This avoids the weight of the goods in the upper level of goods B from bearing on the goods A in the lower level.

Although a preferred embodiment of the invention has been disclosed in detail herein, it will be obvious to those skilled in the art that variations and modifications of the disclosed embodiment can be made without departing from the spirit and scope of the invention as set forth in the following claims.

The invention claimed is:

1. A method of packing an open top container having a bottom wall and side walls with a plurality of goods, comprising retrieving with vacuum cups of an end of arm tool a first plurality of goods in a pattern that fits the size of the bottom wall of said open top container and placing the goods with the vacuum cups between the side walls and on the bottom wall of the open top container, grasping with the vacuum cups a central portion of a flat sheet and bending end portions of the flat sheet to form the flat sheet into an inverted U-shaped insert that includes a central panel sized to cover the first plurality of goods in the open top container and opposed side panels sized to fit between the first plurality of goods and the side walls of the container, inserting with the vacuum cups the inverted U-shaped insert downwardly into the open top container with the opposed side panels of the inverted U-shaped insert extending between the first plurality of goods and the opposed side walls of the open top container, withdrawing the vacuum cups from the open top container and moving the vacuum cups to pick a second plurality of goods, and as the vacuum cups withdraw from the open top container pushing the central panel of the inverted U-shaped insert away from the vacuum cups, and retrieving with the vacuum cups a second plurality of goods in a pattern that fits the size of the central panel of the U-shaped insert and placing the second plurality of goods with the vacuum cups between the side walls of the container and on the central panel of the of the inverted U-shaped insert.

2. The method of claim 1, and wherein the step of placing the second plurality of goods with the vacuum cups between the side walls of the container and on the central panel of the inverted U-shaped insert includes pushing the opposed side panels of the inverted U-shaped insert downwardly toward contact with the bottom wall of the open top container.

3. The method of claim 1, and wherein the step of placing the second plurality of goods with the vacuum cups between the side walls of the container and on the central panel of the inverted U-shaped insert includes pushing the central panel of the inverted U-shaped insert downwardly toward spaced relationship above the first plurality of goods.

4. A method of placing an inverted U-shaped insert into an open top container over goods positioned in the container, with the container including a bottom wall and upwardly extending side walls, said method comprising moving with a tool the inverted U-shaped insert downwardly into the open top container, and as the inverted U-shaped insert moves downwardly inserting side panels of the inverted U-shaped insert into the open top container between the goods in the open top container and the sidewalls of the open top container lifting the tool out of the open top container, and as the tool is lifted pushing with the tool against a central panel of the inverted U-shaped insert to move the opposed side panels of the inverted U-shaped insert farther toward engagement with the bottom wall of the open top container and to move the central panel closer above the work product in the container.

5. The method of claim 4, and further including the steps of grasping with the tool the central portion of a flat sheet and bending end portions of the flat sheet with the tool to form the flat sheet into the inverted U-shaped insert that includes a central panel sized to cover a first plurality of goods in the open top container and opposed side panels sized to fit between the first plurality of goods in the open top container and the side walls of the open top container and being a length greater than the height of the goods in the container.

6. A method of packing an open top container having a bottom wall and side walls with a plurality of goods, comprising retrieving with vacuum cups a first plurality of goods in a pattern that fits the size of the bottom wall of the open top container and placing the goods with the vacuum cups between the side walls and on the bottom wall of the open top container, grasping with the vacuum cups a central portion of a flat sheet and bending end portions of the flat sheet to form an inverted U-shaped insert that includes a central panel sized to cover the first plurality of goods and opposed side panels sized to fit between the first plurality of goods and the side walls of the container and support the central panel spaced above the goods on the bottom wall of the container, withdrawing the vacuum cups from the open top container and moving the vacuum cups to pick a second plurality of goods, and as the vacuum cups withdraw from the open top container pushing the central panel of the inverted U-shaped insert away from the vacuum cups, retrieving with the vacuum cups a second plurality of goods in a pattern that fits the size of the open top container and placing the goods between the side walls of the open top container and on the central panel of the of the inverted U-shaped insert.

7. The method of claim 6 and further including the step of pushing against the second plurality of goods to urge the U-shaped insert and second plurality of goods farther into the open top container.

* * * * *